(12) United States Patent
Gerken et al.

(10) Patent No.: US 6,671,568 B2
(45) Date of Patent: Dec. 30, 2003

(54) METHOD AND ASSISTANCE SYSTEM FOR SUPPORTING WORK PLANNING FOR A PRODUCTION PROCESS

(75) Inventors: Harald Gerken, Ditzingen (DE); Michael Weyrich, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 181 days.

(21) Appl. No.: 09/855,850

(22) Filed: May 16, 2001

(65) Prior Publication Data

US 2002/0010523 A1 Jan. 24, 2002

(30) Foreign Application Priority Data

May 16, 2000 (DE) .......................................... 100 23 668

(51) Int. Cl.[7] ............................................... G06F 19/00
(52) U.S. Cl. ...................................... 700/100; 700/104
(58) Field of Search .................................. 700/100, 104

(56) References Cited

U.S. PATENT DOCUMENTS 5,469,361 A * 11/1995 Moyne .......................... 700/95
5,838,965 A * 11/1998 Kavanagh et al. ....... 707/103 R

OTHER PUBLICATIONS

Juergen Paulokat, et al. "Planning for Machining Workpieces with a Partial–Order, Nonlinear Planner" AAAI Press 1994.

Gunter Spur, "The Virtual Product" Building blocks of the virtual per ducking development, 1997.

Dieter Spath, "Utilization of the nC–Procedure Chain by an Handling–item–Oriented, Iernfahiges Technology Planning System" Doctors of the Ingenieurwissenchaften, 1996.

* cited by examiner

*Primary Examiner*—Leo Picard
*Assistant Examiner*—Michael D. Masinick
(74) *Attorney, Agent, or Firm*—Crowell & Moring LLP (57) ABSTRACT

A method and an assistance system for supporting a multi-stage decision process for producing a work plan for a reduction process is provided. The decision process proceeds from a formulation of tasks, which uniquely characterizes the initial situation on which the decision process is based. In particular, the decision process proceeds from a feature-based CAD model of the workpiece to be produced. The decision process also includes individual decisions, which are built on one another hierarchically and are combined with one another in the form of a decision tree. In order to support the production of a work plan, use is made of an assistance system which is coupled to a database in which the individual decisions taken in the past are stored as cases, those cases which correspond to individual decisions building on one another hierarchically being combined with one another in a relational fashion. The assistance system also makes available for each individual decision a user-defined similarity measure with the aid of which it is evaluated how well a case stored in the database in relation to this individual decision is suitable as a solution for this individual decision. Specific rules are used to adapt this case to the current individual decision.

9 Claims, 6 Drawing Sheets

Table 16 (top-left/main):

| Index # | Description | Comments |
|---|---|---|
| #1 | Cycle A: centring; drilling; drilling; thread cutting | Date 14.02.2000, ... |
| #2 | Cycle B: drilling; drilling; thread cutting | Date 23.05.1999, ... |
| #3 | Cycle C: centring; initial drilling; drilling; drilling thread cutting | Date 18.01.2000, ... |
| #4 | Cycle D: ....... | ... |
| ... | | |

Table 18:

| Index # | Description | Reference | Comments |
|---|---|---|---|
| ... | ... | ... | ... |
| #50 | Drill 382.753 | #2 | ... |
| #53 | Drill 377.123 | #307 | ... |
| ... | ... | ... | ... |
| #60 | Centring drill 189.43 | #3 | ... |
| ... | ........... | ... | ... |

Table 16 (second main):

| Index # | Description | Comments |
|---|---|---|
| #306 | Cycle X: drilling | Date 14.02.2000, Muller |
| #307 | Cycle Y: initial drilling; drilling | Date 23.05.1999, Maier |
| #308 | Cycle Z: initial drilling; drilling; reaming | Date 18.01.2000, Huber |
| #309 | Cycle ZZ: ....... | ... |
| ... | | |

Table 19:

| Index # | Description | Reference | Comments |
|---|---|---|---|
| ... | ... | ... | ... |
| #82 | Rotational speed 1000 rpm | #50 | ... |
| ... | ... | ... | ... |

Table 21 (bottom):

| Index # | Description | Reference | Comments |
|---|---|---|---|
| ... | ... | ... | |
| #195 | Feed 2mm/min | #82 | |
| ... | ... | ... | |

METHOD AND ASSISTANCE SYSTEM FOR SUPPORTING WORK PLANNING FOR A PRODUCTION PROCESS

BACKGROUND AND SUMMARY OF THE INVENTION

This application claims the priority of German Application No. 100 23 668.5, filed May 16, 2000, the disclosure of which is expressly incorporated by reference herein.

The invention relates to a method for supporting a multistage decision process for producing a work plan for a production process, and an assistance system for carrying out this method.

Work planning as a sub-area of production scheduling comprises all individually occurring planning measures which, under continual scrutiny of economic efficiency, ensure that a product or a service is fashioned as production requires. Computer-aided work planning is either performed in a specific work planning system or integrated into a CAD/CAM system. In current work planning and CAD/CAM systems, the user is supported by auxiliary functions based on (fixed) formulas and/or rules in the case of decisions which he must make in the course of the work planning. These formulas and/or rules are included a priori in the system and are therefore static during the application, for which reason the individual experience of the user can be taken over into the system only with a very large outlay. Furthermore, the "best" alternative in a specific decision situation is determined with the aid of complex formulas and/or rules, and so the inner logic of a specific decision is frequently difficult for the user to comprehend. The confidence of the user in a decision proposal calculated in this way is therefore low.

In order to be able to let empirical knowledge flow into the work planning process, it is possible to provide work planning systems with functions which expand the systems from the point of view of planning and/or production engineering. Such a system is described, for example, in "Unterstützung der NC-Verfahrenskette durch ein bearbeitungsorientiertes, lernfähiges Technologieplanungssystem" ["Supporting the NC integrated system by a machining-orientated, adaptive technology planning system"] (dissertation by J. E. Burghardt, Karlsruhe 1996). There, the decision process run through during work planning is modelled together with its technological dependencies as a net-like structure, which is capable of machine learning: new empirical knowledge leads to automatic construction of, and/or automatic changes to the network structure. The "best" solution is calculated automatically for each decision situation on the basis of this network structure. However, because of the high degree of complexity and the rules hidden in the network, this way of finding solutions is opaque to the user to a very high degree and credible only under certain conditions. Furthermore, contradictions in the knowledge base can lead to contradictory proposals for solutions, as a result of which the acceptance of such a system can quickly be undermined.

By contrast with the comprehensive rule-based and/or network-based approaches so far described for automated work planning, individual user knowledge in work planning is mostly episodic. Systems which use the method of case-based deduction are particularly suitable for visualizing and making further use of this episodic knowledge in work planning: in this case, already known solutions are being adapted and used to solve a current problem. Furthermore, all new solutions are stored, as a result of which an independent learning system can be implemented. An application of this method of case-based deduction to the work planning process is known, for example, from "Planning for machining workpieces with a partial-order, nonlinear planner" (J. Paulokat and S. Weß in Proceedings of the AAI Fall Symposium, AAI Press 1994). This document presents an example of a very complex work plan which is illustrated as a sequence of steps to be run through. However, the work planning system described here supports only a single decision situation in each case; there is a lack of the modular design and the granularity which would permit the possibility of easy and rapid transfer of the experience obtained in a work plan for the purpose of drawing up a further (other) work plan. The system also lacks functions which would permit detailed planning of each individual work step (for example, rotational speeds and feed rates in a drilling operation).

It is therefore the object of the present invention to develop a method for supporting work planning on the basis of case-based deduction such that the user is presented with proposals for individual decisions at different planning stages, and that it is possible for proposed solutions and empirical knowledge to be transferred directly between different work plans to be set up. It is also the object of the invention to provide a work planning assistance system for carrying out this method.

The object is achieved according to the invention by a method and system for supporting a multistage decision process for computer-aided production of a work plan for a production process in the course of which the aim is to implement technical features on a workpiece. The decision process comprises individual decisions building on one another hierarchically. Each desired feature to be implemented on the workpiece is automatically classified with reference to defined properties. Reference cases, which have properties similar to the desired feature, are selected from a relational case database in accordance with a previously defined similarity measure. The reference cases are automatically evaluated in accordance with the similarity measure and presented to the user for selection together with production operations connected in the respective reference case to the production of the feature. The user makes a decision by selecting one of the proposed reference cases or interactively storing a new precedent. In relation to each production operation, hierarchical decision trees consisting of individual decisions are automatically run through in accordance with the decision made by the user—starting from the production operations associated with this selection, suitable cases being selected from the case database in each decision stage of the decision tree being evaluated in accordance with a similarity measure corresponding to the relevant individual decision, and presented to the user for selection. Each individual decision taken by the user is stored in the case database.

Accordingly, all individual decisions which are made during various work planning processes are stored as cases in a relational database, the so-called "case database", and combined with one another there. Each decision process to be run through in order to produce a specific work plan is in this case a sequence (or a plurality of sequences) of individual decisions building on one another hierarchically, it being possible for the individual decisions to relate to very different questions (for example, "Which individual operations are necessary to produce a threaded bore of 3 mm diameter?" or "Which feed rate is to be selected when drilling a hole of diameter 2 mm into a steel workpiece?" or "Which clamping accessories are required in the present machining situation?"). Because of the fact that the individual decisions can build on one another in a hierarchical decision chain, and thus that an individual decision simultaneously constitutes a precondition for other decisions, the separately stored individual decisions are combined with one another. This combination of the individual decisions is mapped in the case database as a relational combination of the individual cases. The combination of the cases in the relational case database permits a quick and effective search for the consequences of a decision on further decisions by searching the case database in the sequence of the combinations. The cases stored in the database for a specific decision are presented to the user as solution proposals in this decision situation. The user then has the option of selecting one of these solution proposals, or of producing a new solution not so far contained in the system. In order to evaluate the suitability of a specific solution proposal in a given decision situation, each individual decision is provided with a similarity measure which corresponds to a control system or criterion system which is defined by the user in advance (that is to say as early as when creating the corresponding data structure). All decisions taken by the user in the course of a work planning process are entered in the case database as further data records.

Storing the individual decisions, which build on one another hierarchically, as combined cases in a relational case database permits a very fast and effective search for suitable reference cases for a specific individual decision, since the hierarchical structure of the decision process can be utilized explicitly during this search. Moreover, the hierarchical combination of the cases in the case database means that the information relating to the various subsequent decisions of a specific decision are present in an easily accessible form; depending on a decision concerning a selected production method, a specific tool combination, etc.—this permits an estimate of global overall variables (production costs, machine occupancy times, etc.) associated with the production process and thus—in addition to the evaluations of the individual decisions—for example an evaluation of the selected method with reference to the overall costs.

In order for the production of a work plan with the aid of the method according to the invention to be configured as conveniently as possible, the individual decisions which are selected as cases from the case database or are made anew and/or stored in the case database, are expediently taken over directly into the work plan currently to be produced.

In order to implement the method according to the invention, use is made of an assistance system which comprises a relational database in which the mutually combined individual decisions, which are taken during the work planning, are stored as cases. For each individual decision, the assistance system includes a (user-defined) similarity measure which is used to evaluate how well a specific case is suited to solving this individual decision.

In order to keep the database of the assistance system as compact as possible, and to configure as quickly and effectively as possible the search for suitable cases for a specific decision situation, it is advantageous to store all cases in a single relational database. Furthermore, it is expedient to structure the case database using different structural elements, geometrical elements and/or elements of the machining model (for example operations, machining means, Selected criteria for this purpose are structural elements, geometrical elements and/or elements of the machining model which lead to similar decision processes in work planning. All cases which have the same structural elements and/or geometrical elements and/or elements of the machining model are then collated into one group. Groups whose group properties correspond to those of the current problem are then given priority consideration in searching for possible solutions for a specific decision process. Since suitable cases are found as a rule in this specific group, there is a substantial reduction in the number of data records to be searched.

In order to enhance the transparency of the solution proposals further, it is advantageous to store for each case in the case database—in addition to the information characterizing a decision—further additional data which characterize this special case and render the coming about of this case comprehensible to the user. Such data can comprise, in particular, the name of the machinist and the machining date of the respective case, comments of the machinist relating to the experience gained with this solution, etc. These additional data permit the user to evaluate the respective solution proposal, and constitute a reference for possible queries.

The assistance system is advantageously integrated directly into a CAD/CAM system, such that the assistance system can extract the initial information required for the work planning (geometrical and structural elements, etc.) directly from the CAD/CAM system. The case database is expediently connected to the assistance system as an external database via a standardized interface in order to be able to ensure permanent storage of the cases generated during work planning, independently of the respective application and the respective CAD/CAM system.

Other objects, advantages and novel features of the present invention will become apparent from the following detailed description of the invention when considered in conjunction with the accompanying drawings.

BRIEF DESCRIPTION OF THE DRAWINGS

FIG. 1b is a cross-sectional view of an alternative configuration of the feature of FIG. 1a;

FIG. 2 is a tabular listing of different production cycles for producing the features of FIG. 1a;

FIG. 3 is a schematic illustration of a decision tree, which depicts the decisions which are to be taken to produce the feature of FIG. 1a;

DETAILED DESCRIPTION OF THE DRAWINGS

Figure 1A:
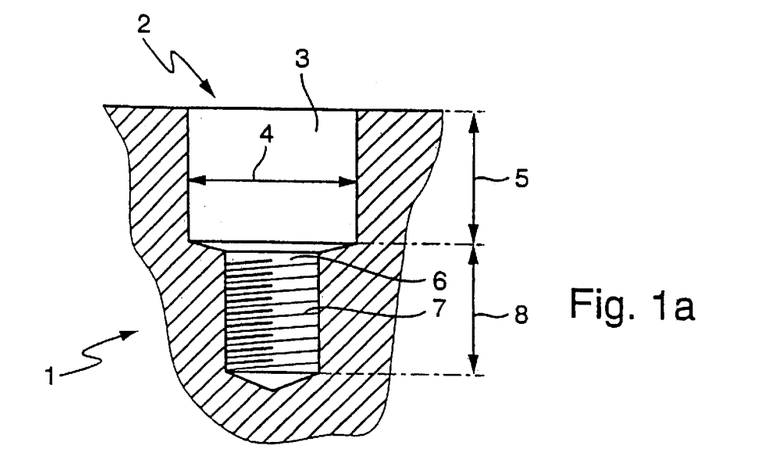
FIG. 1a is a cross-sectional view of a feature on a workpiece including a bore with a collinear thread.
Figure 2:
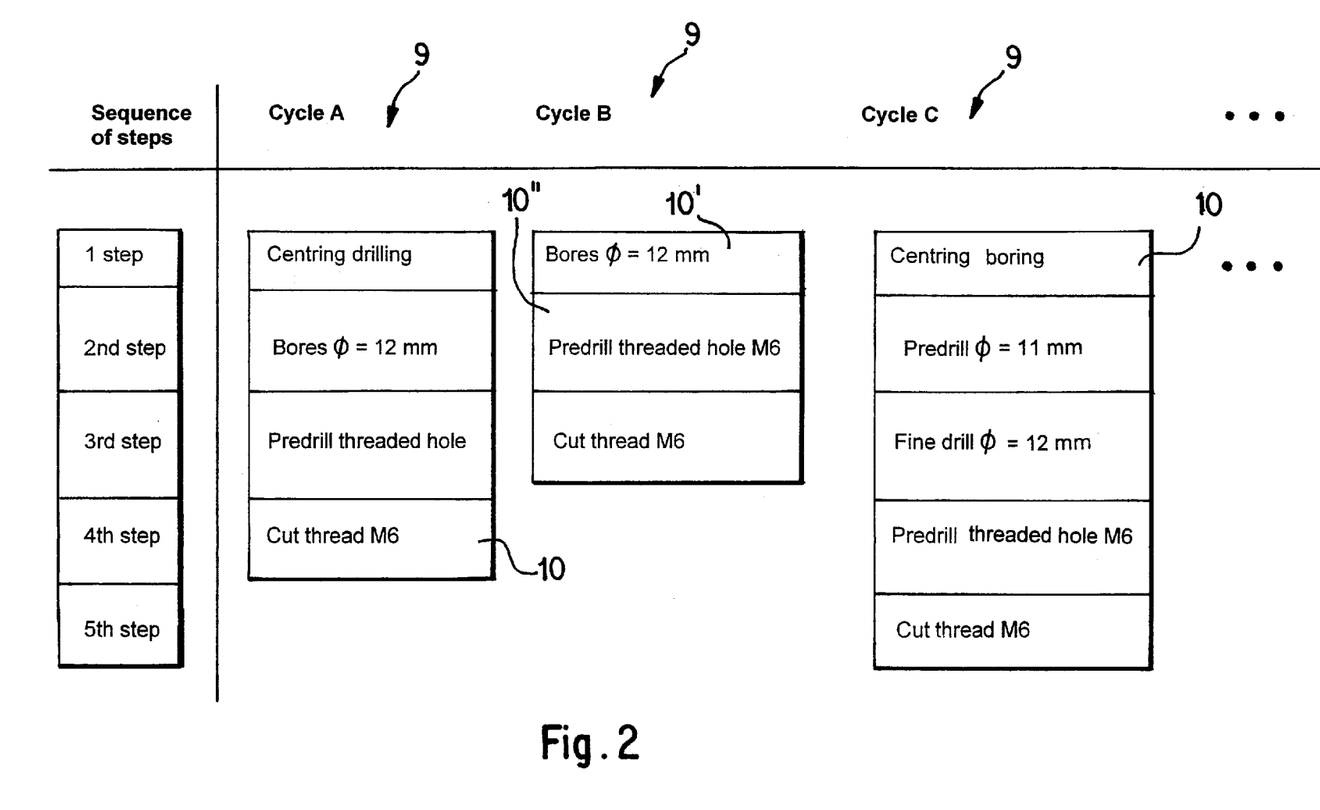
Figure 3:
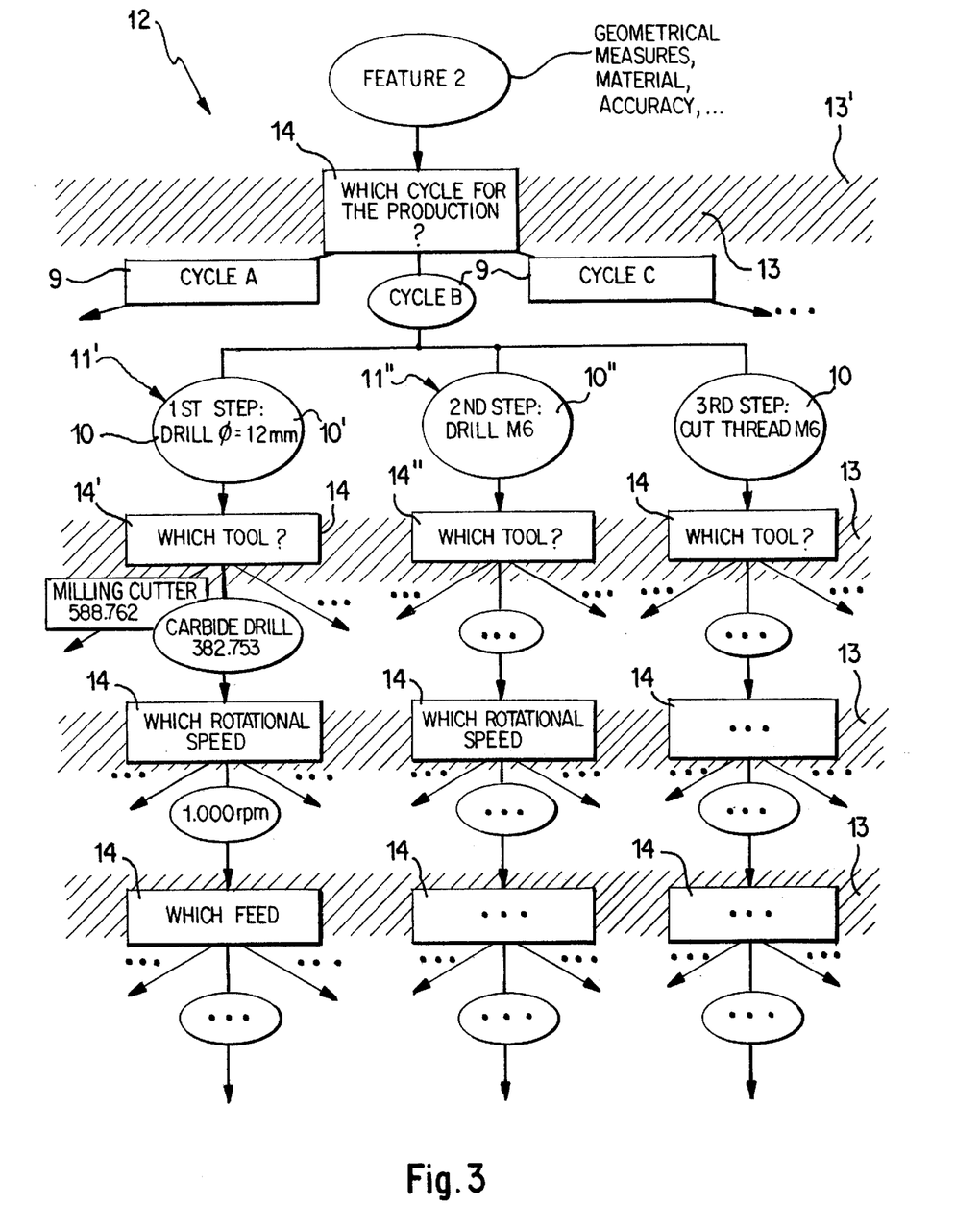

FIG. 1a shows details of a workpiece 1 having a combined feature 2 comprising a bore 3 (with a diameter 4 of 12 mm and a depth 5 of 10 mm) and a thread 6 (with a size 7 M6 and a depth 8 of 10 mm) which is arranged collinearly therewith. As illustrated in FIG. 2, the production of this feature 2 can be performed in different production cycles 9 (cycles A, B and C) of individual steps 10 which differ from one another with reference to the number, type and sequence of the individual steps 10 required. Because of the different type and number of the individual steps 10, and of the different outlay (tools required, changing tools, adjustment between individual steps, etc.), these cycles 9 therefore result in production costs at different levels, but also geometrical accuracies of different degree, etc. in the feature 2 produced. It is necessary as a first step in generating a work plan for producing feature 2 to select the production cycle 9 which is best suited under the given circumstances; this is illustrated in FIG. 3 in the form of a flowchart.

The cycle B was selected by way of example as the optimum strategy in the case shown there. Carrying out each individual step 10 associated with the selected cycle B, called "operation 10" below, requires a specific machining tool (or a plurality of tools), which are selected by the next individual decision. Thus, for example, in the case of the first individual step 10 in cycle B ("drilling with a diameter of 12 mm") the aim is expediently to use a drilling tool (for example a carbide drill) with a diameter of 12 mm (tool identity number 382.753). Once the machining tool has been selected, the machining parameters must be fixed in order to completely determine the relevant individual steps.

In the present case (drilling with a carbide drill with tool identity number 382.753) these are, for example, the rotational speed and the feed rate of the drilling tool, whose values must be selected such that they are adapted, inter alia, to the workpiece, the material of the workpiece 1 to be machined, the accuracy to be achieved in machining, etc. In addition—given the inclusion of the clamping of the workpiece 1—it is necessary to select a suitable strategy for bringing the tool up to the workpiece 1. Once the entire decision tree 11' associated with the first individual step 10 ("drilling with a diameter of 12 mm") has been run through, a similar decision tree 11" is run through for the second individual step 10" ("predrill threaded hole M6"); this is followed by the decision trees for the remaining individual steps. For each combined feature 2 on the workpiece 1, which is produced in one or more individual steps ("operations"), the result for each operation is therefore—as illustrated diagrammatically in FIG. 3—a hierarchical structure ("decision tree" 11', 11") of individual decisions which are run through in a specific sequence in order to produce a work plan for this feature. The decision trees 11', 11" for the first two operations 10', 10" are illustrated in FIG. 3 together with the individual solutions selected in the process against a cross-hatched background.

It is assumed below that the starting point for drawing up a work plan for producing the workpiece 1 is a CAD model of the workpiece 1 in a suitable feature-based form such that the features 2 to be produced are already extracted. If this is not the case, it is firstly necessary to split up the data model of the workpiece into suitable features 2. If a feature-based CAD model (or one divided in accordance with features 2) is available, producing the work plan for the workpiece 1 now requires running through for each feature 2 the decision tree 12 which is illustrated diagrammatically in FIG. 3 and in the case of which, firstly, a first decision stage 13 fixes the production cycle 9 (that is to say the sequence of the individual steps 10) in which the feature 2 is to be produced, and in which for each individual step 9 in a dedicated decision tree 11', 11" the associated decisions are then taken in relation to tool, production parameters, etc. In order to support this stepwise decision process, use is made of an assistance system which leads the user through this decision process and supports him in the stepwise selection of suitable cycles of individual steps 10, tools, production parameters, etc.

The aim of this assistance system consists in making suitable solution proposals available to the user for each individual decision 14 to be made. According to the invention, these proposals correspond to solutions which were adopted in the past by other users in the same (or a similar) decision situation. The user can then use the solutions proposed by the assistance system (in a fashion based on his own experience and taking account of his expert knowledge) to select those which seem to him most suitable—or reject all proposed solutions and produce his own, new solution, instead. The assistance system therefore in no way has the task of "automatically" taking the "correct" individual decisions in a specific decision situation on the basis of a controller provided in the system. Rather, in a specific decision situation 14, the system supplies the user only with support in selecting suitable solutions.

Figure 4:
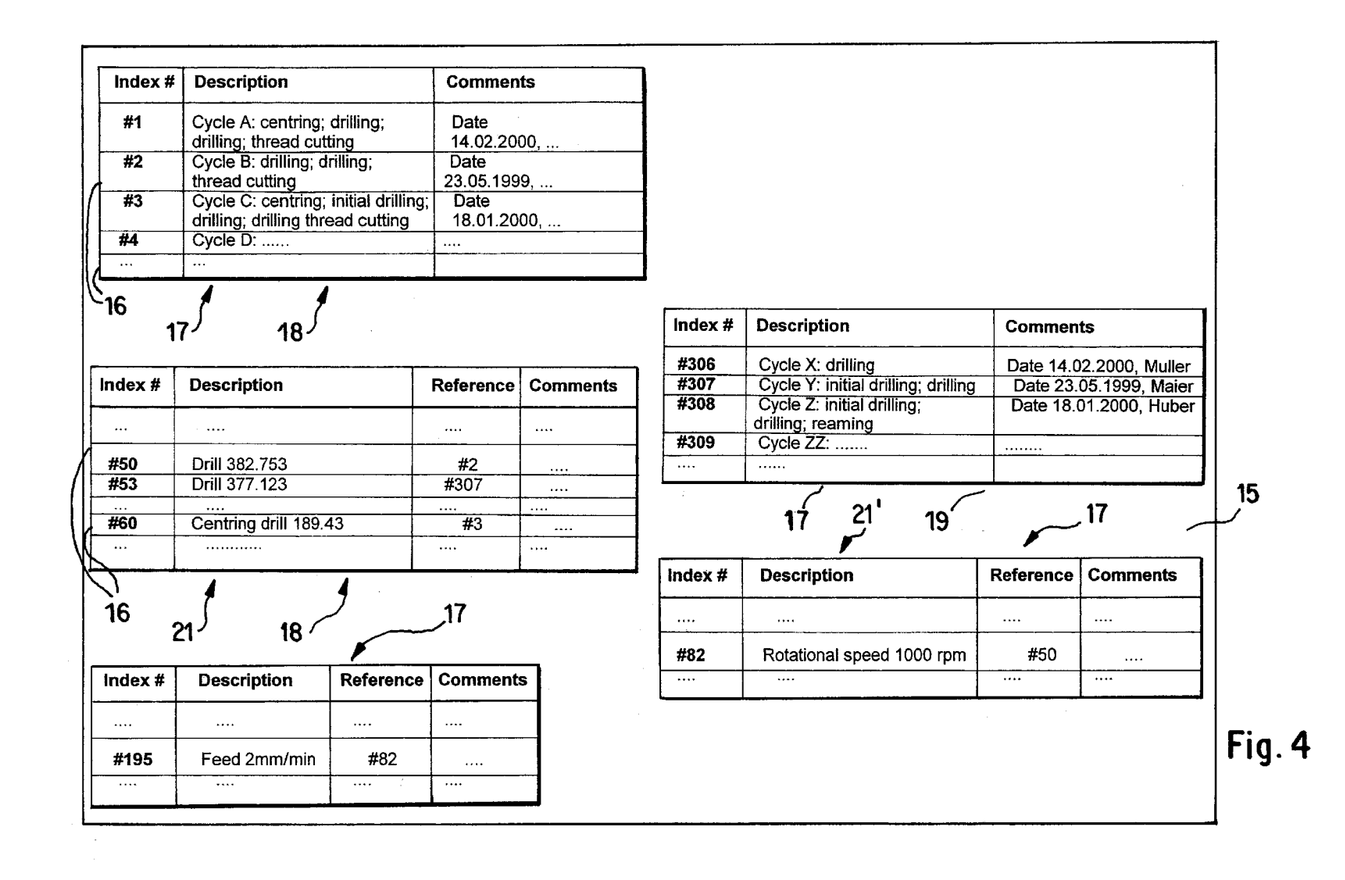
FIG. 4 is a schematic illustration of a case database.

For this purpose, the assistance system uses a standard interface to access a relational database, called the case database 15, which constitutes the database from which the assistance system extracts for each individual situation the solution proposals to be made available to the user. This case database 15 includes the totality (or a specific selection) of all individual decisions taken which were produced in the past by the various users of the system. Each such individual decision taken in the past is denoted below as a "case" 16. Each case 16 is stored in the case database 15 such that, in addition to the decision taken, the context of this case 16 is also stored in the decision tree 12 (see FIG. 3). For each case 16, a combination with the respective higher decision stage is also stored in the hierarchical decision tree 12, 11', 11". An example of the cases 16 stored in the case database 15 and related to the feature 2 in Figure 1a is illustrated in FIG. 4. In this example, the case #2 (index #2) corresponds to the production of feature 2 using the cycle B comprising the three individual steps enumerated in FIG. 2. The selection of the tool "drill with a diameter of 12 mm" is stored in the database as case #50 (index #50) and provided with a reference for the case #2 which represents the relationship of the tool to the associated higher-order hierarchy stage of the selected cycle. The selection of the parameter "rotational speed=1000 rpm", which was selected in the present example (see FIG. 3) is stored in the database as case #82 and provided with a reference to the case #50 which represents the relationship of the parameter of rotational speed to the associated higher-order hierarchy stage of the selected tool. Furthermore, the selection of the parameter "feed=2 mm/sec" which is selected as particularly advantageous for the selected tool/rotational speed combination (see FIG. 3) is stored in the database as case #195 and provided with a reference to the case #82, which represents the relationship of the parameter of rotational speed to the associated higher-order hierarchy stage of the selected tool. The combination of the parameter of feed (case #195) with the rotational speed (case #82), which is combined, in turn, with the selected cycle (case #2) via the tool (case #50) ensures a hierarchical combination along the overall decision chain, which depicts the decision tree 12.

Depicted, furthermore, as cases #1 and #3 in the diagrammatic illustration of the case database 15 (FIG. 4) are the further cycles A and C, which correspond to the different production cycles 9, shown in FIG. 2, for producing the feature 2. A selection of a tool (centring tool with tool identity number 189.43) for the centring drilling named in cycle C (case #3) as first process step is stored in the case database, for example as case #60.

The above-described combination of the cases 16 in the case database 15 utilizes, in particular, the fact that a majority of the individual decisions 14 in a decision tree 12 build on one another hierarchically, and that an individual decision 14 thereby simultaneously represents a precondition for another individual decision 14. Preconditions and decisions are therefore stored independently of one another and combined with one another. The case database 15 therefore becomes free of redundancies.

Figure 1B:
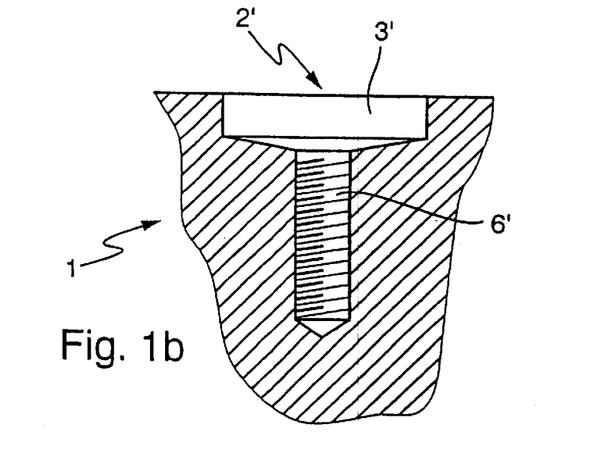
Figure 1C:
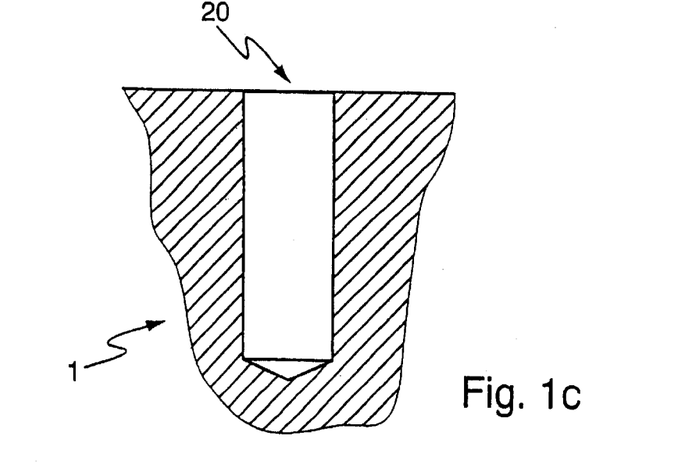
FIG. 1c is a cross-sectional view of a feature on a workpiece including a blind hole.

If the task is now set of producing the feature 2, the assistance system thus searches the case database 15 at first for all cases 16 which describe cycles for producing features whose structural and/or geometrical elements resemble those of the desired feature 2. In this case, all those cases 16 are classified as "similar" which have a bore 3 and a thread 6 collinear therewith. All these cases 16 are assigned to a feature class in which the feature 2 illustrated in FIG. 1a constitutes an element (a further element in this feature class is constituted, for example, by the feature 2' which is illustrated in FIG. 1b and likewise has a bore 3' and a thread 6' collinear therewith). The division of the highly different cases 16 into various feature classes is reflected in the case database 15 in separate Tables 17, each Table 17 corresponding to a feature class. Table 18 in FIG. 4 includes all cases 16 relating to production cycle 9 for all features which have a bore with a collinear thread, and thus all possible production cycles 9 for the features 2, 2' illustrated in FIGS. 1a and 1b. All cases 16 which illustrate the production cycles for producing other features are filed in other tables; thus, for example, all cases which illustrate possible production cycles for producing a "blind bore" (feature 20, illustrated, for example, in FIG. 1c) are compiled in the case database 15 of FIG. 4, in Table 19. This compilation of cases 16 of one feature class in one Table 17 in the case database 15 permits quick and effective searching for suitable reference cases for producing a specific feature.

It is likewise expedient for all cases 16 which relate to a specific operation 10 to be filed respectively in a separate Table 17. Thus, for example, all cases which relate to tools for the operation "drill" are stored in the case database 15 of FIG. 4, in Table 21. This structuring of the case database permits quick searching for suitable tools which come into consideration for a specific operation. If, furthermore, the aim is to find an appropriate rotational speed for the drill having the identity number 382.753, a selective search is made through Table 21' (that is to say that table which contains all cases which relate to feed) for those cases which are combined with the tool having the identity number 382.753. Since Table 21' can already be pre-sorted in terms of the tool combinations, appropriate cases can be identified easily and quickly. If the user'selection turns out to be in favor of a feed not yet used, a new case is stored in Table 21' in accordance with the pre-sorting in terms of tools, and combined with the relevant tool. If, moreover, a new tool is to be used, this must additionally be newly entered in Table 21 (that is to say the table which includes the tool assignments).

With the aid of a control element described further below, or of a suitably configured control surface, for each feature 2 to be produced, the assistance system leads the user through the decision trees 12 corresponding to this feature. In this case, the structure of the decision tree 12 (that is to say the sequence in which the individual decisions 14 are made) determines the structure of the data model (and thus the combination of the individual cases) in the case database 15. The assistance system offers the user for selection solution proposals for each individual decision 14; these solution proposals correspond to cases 16 from the case database 15 which are evaluated by the assistance system as being technically "well suited" to the relevant individual decision 14.

If a specific individual decision 14 is pending, consideration is given as solution proposals to only those cases 16 which are stored in the Table 17, corresponding to this individual decision 14, in the case database 15. This reduces the part of the database to be searched, and thus substantially reduces the number of cases to be analyzed. If, for example, a production cycle is to be selected for producing a blind bore 10 (FIG. 1c), only the Table 19 of FIG. 4 is searched, because all the cases 16 for production cycles 9 for blind bores 20 are stored in this Table 19. The evaluation as to which cases 16 from a Table 17 are particularly "well suited" as solution proposals for an individual decision is then performed with the aid of what is called a similarity measure. This similarity measure is a specific set of formulae and/or rules which are used to calculate the suitability of all solution proposals of Table 17 with reference to the concrete individual decision 14 pending. As an example, the following rules, inter alia, can be used for individual decisions 14 referring to production cycles 9: "As few individual steps as possible, since each additional individual step causes additional costs", or "Sequence of the individual steps as far as possible such that as few reclampings as possible of the workpiece are required between the individual steps". The following rule, inter alia, is sensible for individual decisions 14 referring to tool selection for drilling a blind hole: "Select only those cases which correspond to tools having a diameter smaller than or equal to the hole to be produced on the workpiece", etc.

Each individual decision 14 is assigned a dedicated similarity measure; thus, for example, the similarity measure which corresponds to the individual decision 14' for selecting a drilling tool differs from the similarity measure which corresponds to the individual decision 14" for selecting a thread-cutting tool (see FIG. 3). The cases 16 selected for an individual decision 14 taking account of the similarity measure are expediently offered to the user together with their evaluation so that the user can recognize which cases 16 are particularly suitable from the point of view of the assistance system for solving this individual decision 14.

In order to give the user as comprehensive as possible an image of each solution proposal for each individual decision 14, in addition to the solution proposal relating to the individual decision 14, each case 16 of the case database 14 can include further information which permits the user to evaluate this solution proposal. Thus, for example, it is expedient to specify the frequency with which a specific solution proposal was selected in the past. This provides the user with an indication as to which solution proposals have already been evaluated by other users as particularly suitable. Furthermore, it is advantageous to specify for each case 16 the production date of the case 16 and the name of the person who produced this case 16. If the case 16 is already quite old (and there is no more recent case having the same parameters), the user can appraise this as an indication that this solution proposal is possibly out of date and should therefore be rejected as being not advantageous. The name of the person who produced the case 16 indicates to the present user someone he can contact concerning questions, problems, etc. In order to aid the present user in making contact with the producer, it can be expedient to couple the case database 15 to a personnel databank via which the field of work, telephone number etc. of the producer can be called up automatically. In addition, it is possible to provide for each case 16 a comments box in which the producing user enters notes on the experience he has had with this solution proposal (for example a text such as "In a similar situation, on 14.02.2000 Mr Müller used a rotational speed of 1,000 revolutions per minute and was successful"). This type of unstructured commentary on a solution proposal has the advantage that the episodic nature of the individual user knowledge can be particularly well displayed thereby.

The assistance system is expediently integrated into the CAD/CAM system being used, such that a direct access may be made to the geometrical data of the workpiece 1 to be produced.

Figure 5A:
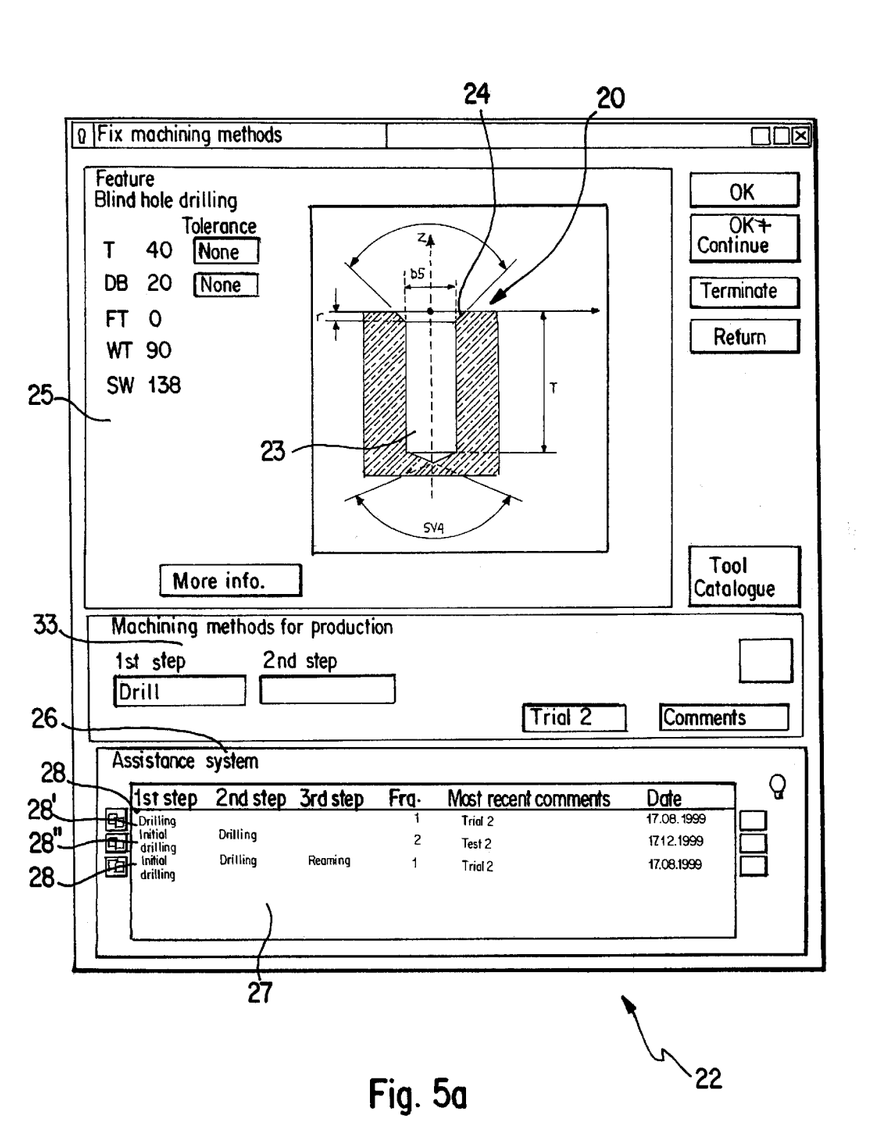
FIGS. 5a and 5b are screen displays of an operator interface of an assistance system for conducting work planning according to the invention.
Figure 5B:
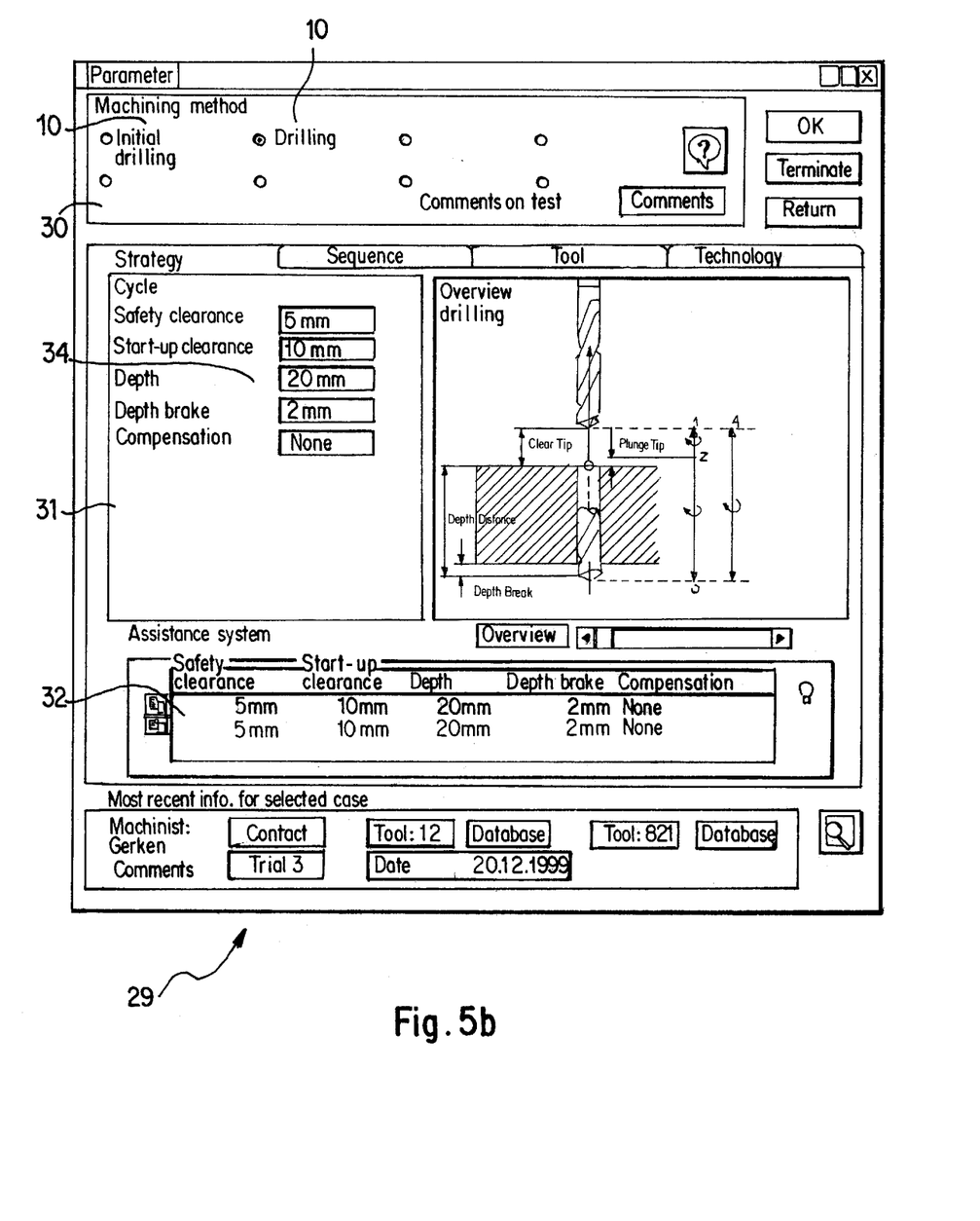

An example of a control input device of the assistance system is illustrated in FIGS. 5a and 5b. FIG. 5a shows a screen display 22 of a start page of the assistance system which corresponds to the first decision stage 13' of the decision tree 12, specifically the selection of the production cycle 9, which is selected for producing the feature 20. For the sake of simplicity, a blind hole 23 with a chamfer 24 is selected in this example as the feature 20 to be produced. The feature 20 to be produced is illustrated with its dimensions in the upper region 25 of the screen 22. The lower region 26 of the screen 22 is reserved for the assistance system. Various proposal solutions 28, extracted from the case database, for suitable production cycles 9 for producing the desired feature 20 are displayed in a proposal box 27. These solution proposals 28 are illustrated in this case in a sequence such that the solution proposal 28' best suited after taking account of the similarity measure for this individual decision, is named in the first position, followed by further solution proposals 28" in order of their suitability. Furthermore, a listing of the associated individual steps, the production date of this case and a commentary are specified for each proposed production cycle. The user can select a specific production cycle by clicking on a specific solution proposal 28'. This automatically opens a further screen window 29 (see FIG. 5b), which guides the user through the decision tree 11', which depends hierarchically on the selected production cycle 28. If, for example, the production cycle 28' named in second place in FIG. 5a (and comprising the individual steps of initial drilling and drilling) was selected in FIG. 5a, the screen window 29 includes in the upper part 30 the machining methods corresponding to these individual steps 10, and in the lower part 31 of the screen window 29 the user is guided by means of different pull-down windows through the individual decisions 14 referring to tool, production parameters, etc. For each individual decision, the user is offered in a separate window 32 solution proposals 28 which correspond to the evaluated cases 16 from the case database 15. The individual decisions made by the user are stored in the case database 15 as further cases 16. Furthermore, the work plan is drawn up on the basis of the individual decisions with the aid of the correspondingly selected tools, parameters, etc.

In addition to the selection of solution options already contained in the case database 15, the assistance system offers the user the possibility of generating "dedicated" solutions (and thus also novel cases in the databank 15). Thus, in order to select the production cycles, for example, the screen window 22 includes a box 33 for inputting a new production cycle 9, which the user can input interactively. Likewise, there are also provided in the further screen windows 29 data boxes 34 in which the user can enter self-selected parameters for the respective individual decision 14.

The decision trees 11', 11", 12 illustrated in FIG. 3, in the case of which—starting from a cycle of individual steps 14 which is selected for producing a feature 2, 20—firstly the tools are selected for each individual operation, and then suitable parameters for the respective tool, etc., fix the hierarchical structure of the decision process, and thus also the data models in which these decision processes are depicted. It is possible in principle to have a multiplicity of different decision trees 11', 11", 12 (and thus of different data models)—for example, the selection of the tool can be preceded by the selection of a machine tool (but fixing a specific structure of the decision tree 12 (and thus of the associated data model) is a precondition for the overall structuring of the assistance system.

So far, an assistance system has been described which accesses a single relational case database 15 in which all cases 16—structured according to Tables 17—are stored. In general, however, the cases 16 can also be located in different case databases 15 which are networked with the assistance system, if the above-described hierarchical combination of the individual cases 16 with one another is ensured.

Furthermore, so far the starting point has been specific features 2, 20 whose decision trees 12, and the similarity measures associated with each individual decision are known. If the aim is for a feature not previously provided to be accepted anew into the assistance system, an operator must firstly construct the decision tree on which this new feature is based; this decision tree defines the data model of the associated feature. Furthermore, it is necessary to provide in the case database 15 new tables in which the cases are stored with reference to the production cycles and the operations for producing this new feature. Finally, each individual decision associated with the new feature must be provided with a suitable similarity measure. These steps for setting up a new feature in the assistance system certainly constitute a substantial outlay for the operator, but need be run through no more than once for a new feature.

In addition to the application, so far described, of the method according to the invention to an assistance system for work planning, the method can also be applied in a similar way to an assistance system for drawing up a measuring plan: the selection of the machining steps is replaced in this case by the selection of the measuring steps which are necessary for measuring the workpiece under consideration. The selection of the (machining) tools is replaced by the selection of suitable measuring means; the clamping of the workpiece, the strategy for bringing up the measuring means, etc. are selected in a similar way as in the above-described stepwise generation of the work plan. All individual decisions which are made by the operator in the course of drawing up the measuring plan are—in accordance with the hierarchical structure of the basic data model—stored in a case database as combined cases.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of supporting a multistage decision process for computer-aided production of a work plan for a production process used to implement technical features on a workpiece, the method comprising the acts of:
automatically classifying each desired feature to be implemented on the workpiece with reference to defined properties;
selecting from a relational case database reference cases having properties similar to the desired feature in accordance with a previously defined similarity measure;
automatically evaluating the reference cases in accordance with the similarity measure in presenting to a user the reference cases for selection together with production operations connected in a respective reference case to a production of the desired feature;

deciding upon one of the proposed reference cases or interactively storing a new precedent as a new reference case;

in relation to each production operation, automatically running through a hierarchical decision tree in accordance with decisions made by the user in which, starting from production operations associated with this selection, suitable cases being selected from the relational case database at each decision stage of the decision tree, said suitable cases being evaluated in accordance with the similarity measure corresponding to the relevant individual decision presented to the user; and storing each individual decision made by the user in the relational case database.

2. The method according to claim 1, further comprising transferring into a work plan the individual decisions made during the decision process.

3. An assistance system for supporting a multistage decision process for producing a work plan for a production process in which the decision process proceeds from a formulation of tasks characterizing an initial situation on which the decision process is based, the decision process including individual decisions that build on one another in a hierarchical manner, the assistance system comprising:

a case database storing individual decisions taken in the past as reference cases, said reference cases corresponding to the individual decisions building on one another hierarchically being combined in a relational fashion with one another in the case database; and a controller that makes available to a user for each individual decision a user-defined similarity measure for evaluating a suitability of the reference cases stored in the case database in relation to a particular individual decision as a potential solution for said particular individual decision.

4. The assistance system according to claim 3, wherein all reference cases are stored together in a single relational case database.

5. The assistance system according to claim 3, wherein said case database is structured based on at least one of structural, geometrical and machining model elements.

6. The assistance system according to claim 3, wherein said case database additionally stores associated data relating to an individual decision.

7. The assistance system according to claim 6, wherein said associated data comprises machinist and decision data information.

8. The assistance system according to claim 3, wherein said case database and control unit are at least part of a CAD/CAM system.

9. A computer product for supporting a multi-stage decision process for producing a work plan for a production process implementing technical details on a workpiece, the computer product comprising:

a computer readable medium having stored thereon program code segments that:

build a relational case database of cases of individual decisions made in the past that build on one another in a hierarchical manner, said cases being part of a decision process that proceeds from a formulation of tasks characterizing an initial situation on which a decision process is based;

operates a user interface that makes available to a user for each individual decision a user-defined similarity measure for evaluating a suitability of the cases stored in relation to a particular individual decision as a solution for the particular individual decision.

* * * * *

Disclaimer

6,671,568 B2 — Harald Gerken, Ditzingen (DE); Machael Weyrich, Esslingen (DE). METHOD AND ASSISTANCE SYSTEM FOR SUPPORTING WORK PLANNING FOR A PRODUCTION PROCESS. Patent dated Dec. 30, 2003. Disclaimer filed May 26, 2006 by the inventor, Harald Gerken.

Hereby enters this disclaimer to claims 1-9.

*(Official Gazette, August 1, 2006)*